June 3, 1941.　　　D. H. REEVES　　　2,244,081

ICE CUBE MECHANISM

Original Filed March 5, 1938　　　3 Sheets-Sheet 1

INVENTOR.
DONALD H. REEVES.
BY
Spencer, Hardman and Fehr.
HIS ATTORNEYS.

June 3, 1941.  D. H. REEVES  2,244,081
ICE CUBE MECHANISM
Original Filed March 5, 1938  3 Sheets-Sheet 2
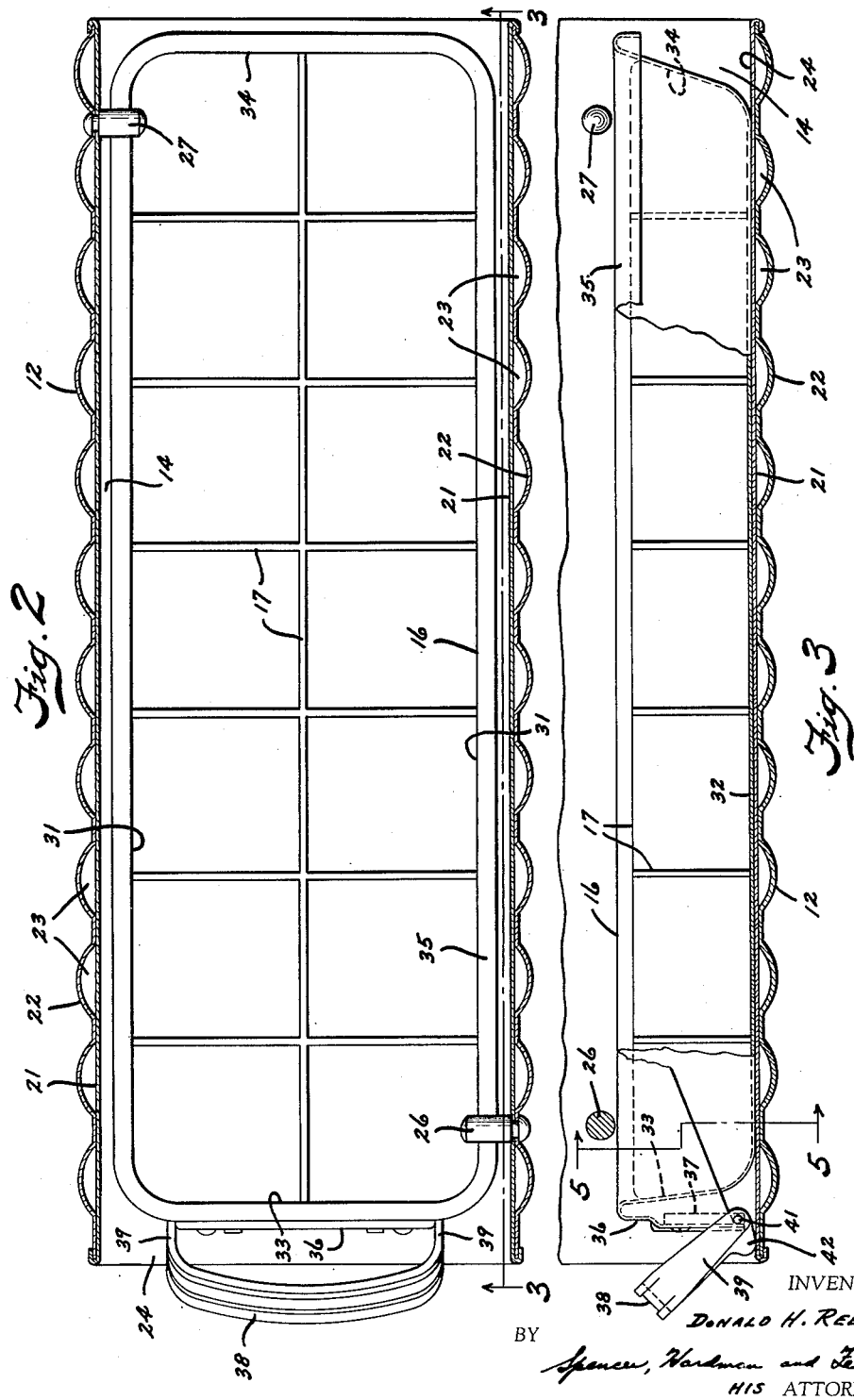
INVENTOR.
DONALD H. REEVES.
BY
Spencer, Hardman and Zeh.
HIS ATTORNEYS.

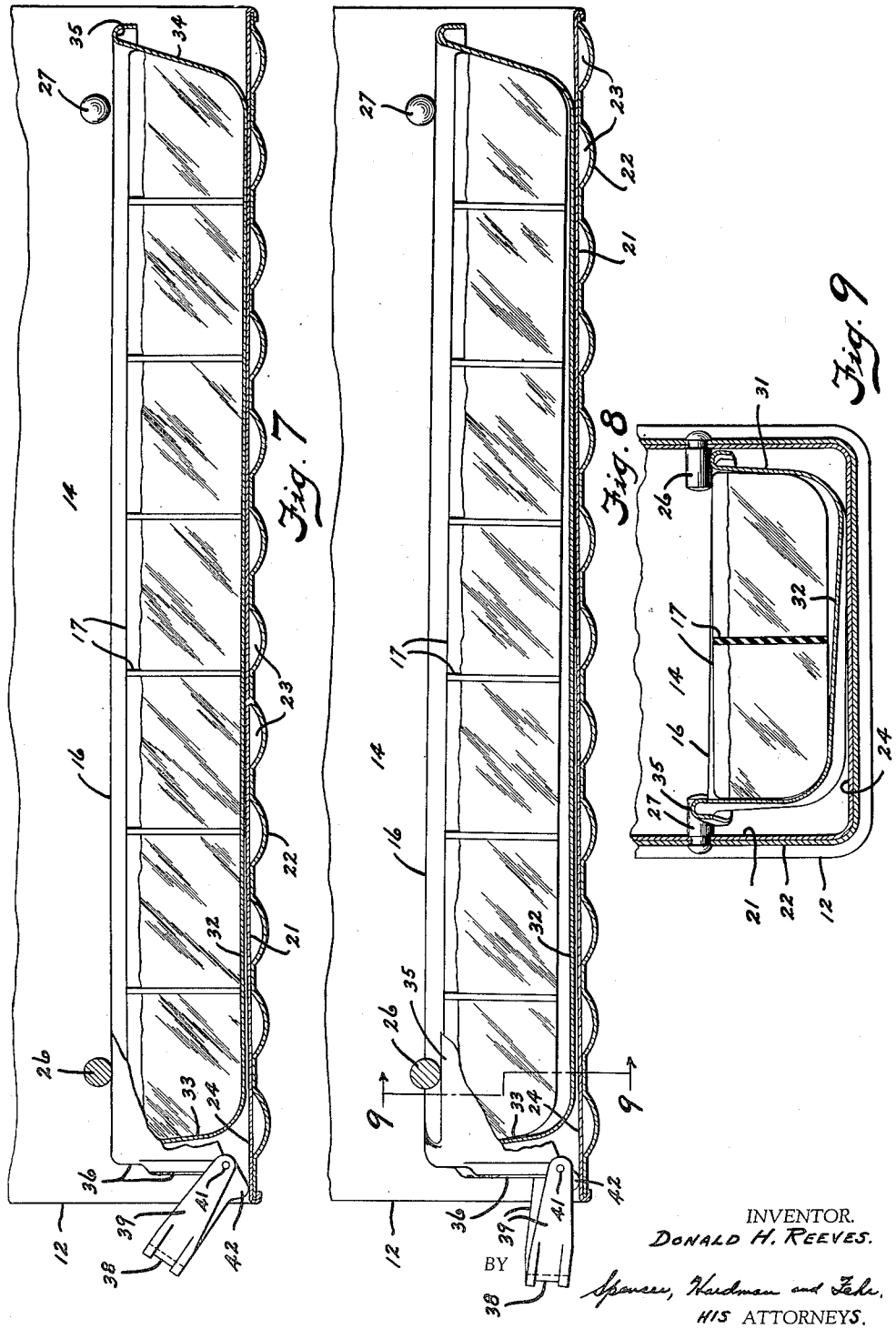

Patented June 3, 1941

2,244,081

UNITED STATES PATENT OFFICE 2,244,081

ICE CUBE MECHANISM

Donald H. Reeves, Dayton, Ohio, assignor to General Motors Corporation, Dayton, Ohio, a corporation of Delaware Application March 5, 1938, Serial No. 194,121
Renewed November 2, 1939

10 Claims. (Cl. 62—108.5)

This invention relates to refrigerating apparatus and particularly to freezing devices such as ice trays employed in household refrigerators.

An object of the present invention is to provide an improved liquid freezing device and a novel method of removing the device from a freezing compartment of a refrigerating apparatus to thereby facilitate harvesting of ice therefrom.

Another object of my invention is to utilize the force applied to a metal tray of a freezing device to break the bond between same and its freezing support in or on an evaporator of a refrigerating system to also break the bond between walls of the tray and ice contained therein prior to removing the device from the evaporator.

A still further and more specific object of my invention is to stop the upward movement of a flexible metal tray while being elevated relative to its freezing support at a predetermined point and cause twisting of the tray to thereby utilize the force employed to release the tray from its support for also breaking the bond between walls of the tray and ice frozen therein to permit removal of ice from the tray without the aid of additional means.

Further objects and advantages of the present invention will be apparent from the following description, reference being had to the accompanying drawings, wherein a preferred form of the present invention is clearly shown.

In the drawings:

Fig. 2 is an enlarged view of the freezing device taken on the line 2—2 of Fig. 1;

Fig. 3 is a side view taken on the line 3—3 of Fig. 2 showing the freezing device partly in section and partly in elevation;

Fig. 7 is a side sectional view of the freezing device illustrating the relation of the ice tray thereof relative to its support as disclosed in Fig. 6 and is taken on the line 7—7 thereof;

Fig. 8 is a view similar to Fig. 7 showing the tray in a twisted position with walls thereof separated from the ice contained in the tray; and Fig. 9 is a vertical sectional view of the freezing device taken on the line 9—9 of Fig. 8 to further illustrate the twisted position of the tray for breaking the ice bond between walls thereof and its frozen contents.

Figure 1:
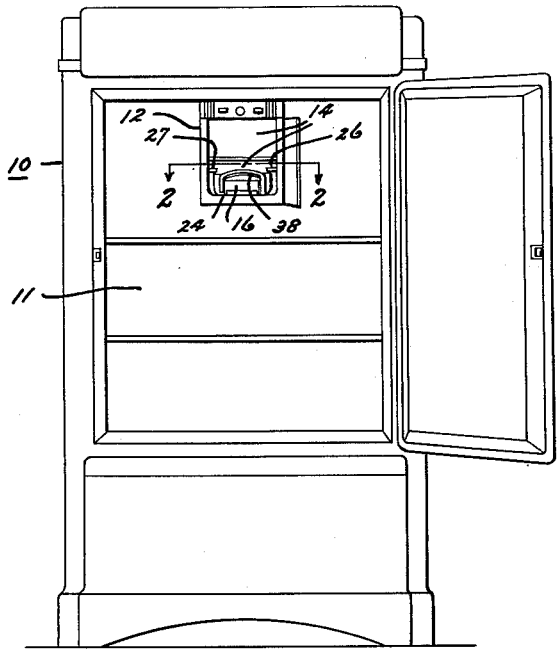
Fig. 1 is a view of a refrigerating apparatus including a cabinet provided with a food storage compartment having a freezing device constructed in accordance with the present invention located therein.

Referring to the drawings, for illustrating the present invention, I have shown in Fig. 1 thereof a refrigerating apparatus including an insulated household refrigerator cabinet 10 having a food storage compartment 11 formed therein. A refrigerant evaporator or cooling element 12 is mounted in the upper portion of the food compartment 11 to cool and cause circulation of air therein. The evaporator 12 may be of any suitable or desirable construction and is preferably of the sheet metal type wherein double sheet metal refrigerant conveying walls form a sharp freezing chamber which is protected from the circulating air in the food compartment 11. A shelf may be employed to divide the chamber into a plurality of sharp freezing compartments 14. A liquid freezing device comprising a resilient thin walled metallic tray 16, having a flexible rubber grid 17 removably disposed therein, is positioned in a chamber 14 of the evaporator 12. The grid 17 includes a plurality of partitioning walls which divide the interior of tray 16 into rows of cells or compartments which form ice blocks when the liquid in the device is frozen by the cooling effect produced by evaporator 12. Ordinarily, the freezing, in apparatuses of the type disclosed, of liquids in the freezing devices causes the metal tray 16 to become bonded to its support and ice within the tray to be bonded to the tray walls. My invention contemplates the provision of an improved structure wherein both of these ice bonds can be quickly and easily broken prior to removing a freezing device from its support in a sharp freezing compartment to thereby facilitate removal of the grid 17 together with ice blocks adhering thereto from the tray 16. In carrying out this contemplation, I propose to utilize the force applied to the tray to release same from its support to also break the bond between ice in the tray and the tray walls as will be more fully described hereinafter.

The cooling element or evaporator 12 of the present refrigerating apparatus is formed of superimposed and welded together metal sheets 21 and 22. At least one of these metal sheets of the evaporator 12 is corrugated to provide a plurality of refrigerant evaporating passages 23, and the sheets 21 and 22 are formed into a double walled substantially U-shaped structure to provide walls of the sharp freezing compartments 14. The inner metal sheet 21 at the bottom wall 24 of evaporator 12 forms a flat refrigerated sharp freezing support for the tray 16 of the freezing device. Located in fixed relation with respect to and at a predetermined distance above the tray support 24, there is provided a pair of stud elements 26 and 27. Each of these stud elements 26 and 27 pass through an upright wall of evaporator 12 and are riveted, welded or otherwise rigidly secured thereto. The stud elements 26 and 27 are disposed on diagonally opposite sides of tray 16 so as to locate the one stud element 26 at the front of compartment 14 and the other element 27 near the rear of compartment 14 (see Fig. 2). Elements 26 and 27 project inwardly of the upright side walls of evaporator 12 so as to be in the path of elevation of tray 16 relative to its support 24 and form means adapted to be engaged by the top of the tray for a purpose to be hereinafter more fully described.

Figure 4:
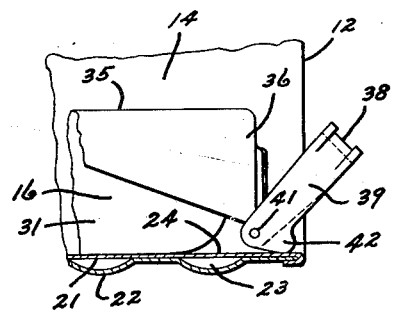
Fig. 4 is a fragmentary view showing a handle lever attached to the ice tray of the freezing device.
Figure 5:
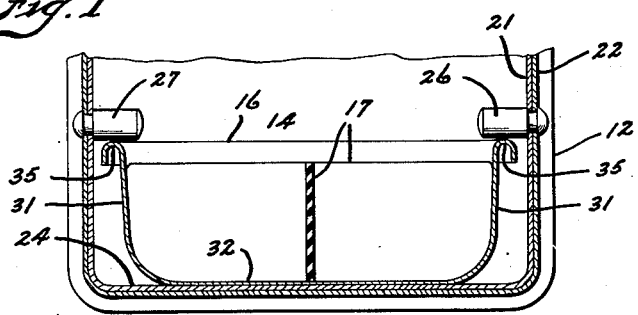
Fig. 5 is a vertical sectional view of the freezing device taken on the line 5—5 of Fig. 3 showing the normal position of the ice tray relative to its support.
Figure 6:
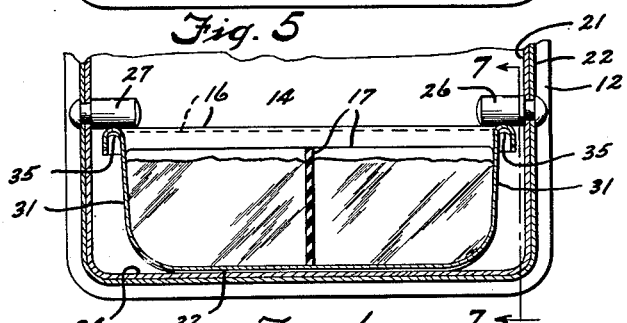
Fig. 6 is a view similar to Fig. 5 showing the front end of the ice tray of the freezing device elevated relative to its support.

The metal tray 16 of the present invention includes side walls 31 (see Figs. 5 and 6), a bottom wall 32, and opposed end walls 33 and 34. The tray side and end walls diverge outwardly toward the top of the tray to facilitate the removal of a mass of ice therefrom. The upright walls 31, 33 and 34 of the tray 16 have their upper portion rolled or bent over as at 35 to provide a rim which extends continuously around the top of the tray. A portion of the metal of tray 16 is extended downwardly from the rim 35, as at 36 (see Figs. 3 and 4), at the front of the tray and forms a mounting for a heavy metal piece 37 (see Fig. 3) which has a handle 38, provided with legs 39, pivotally secured thereto as by pins or the like 41. Handle 38 serves as a lever for imparting force between the tray 16 and its support 24 to break the bond therebetween. In order to apply this force, I provide on one leg 39 only of lever or handle 38 a cam portion 42. The cam 42 is shaped to normally engage the support 24, while the tray 16 is positioned thereon, and maintain lever or handle 38 in an easily accessible position to be grasped by the hand. It is to be noted that the cam 42 engages the support 24 at a point spaced remote from the longitudinal vertical center of tray 16 to thereby cause a lifting action of the tray relative to its support beginning at one corner of tray 16 to thereby substantially peel same from its support. While the rim 35 increases the structural rigidity of metal tray 16 the metal thereof is sufficiently resilient to permit peeling of the tray from its support and flexing of walls thereof in a manner to now be described.

Assume that water has been frozen in tray 16, by the refrigerating effect produced by the cooling unit or evaporator 12, and it is now desired to remove the tray of the freezing device from the evaporator and harvest ice blocks, formed in the tray by grid 17, therefrom. Handle or lever 38 is grasped by the hand and pulled outwardly thus moving cam 42 thereon downwardly to cause the cam to apply force upon the tray support 24. This force imparted between the tray 16 and its support 24 elevates the front end of tray 16 to cause its top or rim 35 to engage the stud element 26 (see Figs. 6 and 7). The elevation of the front portion of tray 16 is stopped by the obstructing element 26 and continued movement of lever or handle 38 tends to tilt the tray, whereupon the rear portion thereof or rim 35 engages the back stud element 27. The ice bond between the tray 16 and its support 24 is thereby broken and the tray is prevented, by its engagement with elements 26 and 27, from being further raised relative to its support. Therefore, the force applied to lever or handle 38 is caused, by cam 42 being disposed away from the longitudinal vertical center of the tray 16, to create a twisting of the tray. The position of stud elements 26 and 27 on diagonally opposite sides of the tray 16 together with the force imparted to the tray, by cam 42 on lever 38, cooperate to cause twisting of the tray 16 within and prior to removal of the tray from the compartment 14 (see Figs. 8 and 9). Twisting of metal tray 16 in the manner illustrated and described breaks the bond between ice contained in the tray and the tray walls 31, 32, 33 and 34. After the bond breaking operation has been performed, as described, the resilient metal tray 16 will spring back or return to its normal flat pan-like form, and it may then be easily removed from its support 24 and compartment 14. Upon removal of tray 16 from the sharp freezing compartment 14 its, loosened, frozen content may be removed therefrom by inverting the tray whereupon the mass of ice will freely fall therefrom. The ice blocks formed by and adhering to the grid 17 may then be readily removed from the grid for use.

While I have disclosed the rubber grid 17, having a flexible longitudinal partition and a plurality of flexible transverse partitions, disposed within the tray 16 for dividing the interior of the tray into a plurality of ice block cells or compartments, it is to be understood that any desired or conventional grid structure may be disposed therein. My invention concerns and utilizes the force employed to break the ice bond between a tray and its support to twist the tray for breaking the bond between walls thereof and its mass of frozen content. For this reason, it is apparent that any movable rigid metal wall, or the like, grid structure may, if desired, be employed for releasing the ice blocks from the grid walls after the grid and mass of ice adhering thereto have been removed from the tray.

From the foregoing, it will be apparent that I have provided a novel refrigerating apparatus wherein the freezing device portion thereof is of improved construction. I have provided an improved mechanism for and method of releasing an ice tray from its support whereby the force for releasing the tray is utilized in a particular manner to also break the frozen content of a tray from the tray walls. My improvement eliminates deforming of a top edge portion of an ice tray which is usually caused by a lever, or the like, acting at one point at all times thereupon to remove the grid and ice therefrom. My invention accomplishes in one operation what has heretofore had to be carried out by two or more separate operations and thereby facilitates the harvesting of ice blocks from a freezing device.

While the form of embodiment of the invention as herein disclosed, constitutes a preferred form, it is to be understood that other forms might be adopted, all coming within the scope of the claims which follow.

What is claimed is as follows:

1. A refrigerating apparatus comprising in combination, an evaporator, a resilient metallic tray member adapted to contain a substance to be frozen by the refrigerating effect produced by said evaporator, a support member associated with said evaporator for supporting said tray member, a lever pivotally mounted upon one of said members, said lever being adapted to engage the other of said members for imparting force between said members to elevate the tray member relative to its support member, means disposed in the path of elevation of said tray member, said means being fixed relative to said support member and adapted to be engaged by said tray member for stopping the elevation thereof, and said means being arranged with respect to the point of imparting force between said members to cause the force, upon engagement of the tray member with said means, to twist said tray member and break the bond between its frozen contents and walls thereof.

2. An apparatus in accordance with claim 1 wherein the lever is mounted upon the tray member and adapted to engage the support member for imparting force between said members.

3. A refrigerating apparatus comprising in combination, an evaporator, a resilient metallic tray member adapted to contain a substance to be frozen by the refrigerating effect produced by said evaporator, a support member associated with said evaporator for supporting said tray member, a lever pivotally mounted upon one of said members, said lever being adapted to engage the other of said members for imparting force between said members to elevate the tray member relative to its support member, means fixed relative to said support member and disposed in the path of elevation of said tray member, said means comprising a pair of elements located in spaced apart relation to one another along the length of said support member and disposed on diagonally opposite sides of the tray member for engagement thereby to stop the elevation of said tray member, and the arrangement of said elements relative to the point of imparting force between said members being such that the force, upon engagement of the tray member with said fixed means, causes twisting of said tray to break the bond between its frozen contents and walls thereof.

4. An apparatus in accordance with claim 3 wherein the lever is mounted upon the tray member and is adapted to engage the support member for imparting force between said members.

5. A refrigerating apparatus comprising in combination, an evaporator, a resilient metallic tray adapted to contain a substance to be frozen by the refrigerating effect produced by said evaporator, a support associated with said evaporator for supporting said tray, a lever pivotally mounted upon the front end of said tray and having a part thereof adapted to engage said support, said part of said lever engaging said support at a point on one side of and remote from the longitudinal vertical center of the tray for imparting force between said tray and said support to elevate the tray relative to its support, means fixed relative to said support and disposed in the path of elevation of said tray, said means comprising a pair of elements located in spaced apart relation to one another along the length of said support and disposed on diagonally opposite sides of the tray for engagement thereby to stop the elevation thereof, and the arrangement of said elements relative to one another and to the point of imparting force between the tray and its support being such that the tray first engages one of said elements and thence the other thereof and the force causes twisting of said tray to break the bond between its frozen contents and walls thereof.

6. A refrigerating apparatus comprising in combination, an evaporator, a resilient metallic tray adapted to contain a liquid to be frozen by the refrigerating effect produced by said evaporator, a grid disposed within said tray and dividing the interior thereof into a plurality of ice block compartments, a support associated with said evaporator for supporting said tray, a lever mounted upon said tray, said lever having a part thereof adapted to engage said support for imparting force between said tray and its support to elevate the tray relative to said support, means disposed in the path of elevation of said tray, said last named means being fixed relative to said support and adapted to be engaged by said tray for stopping the elevation thereof, and said last named means being arranged with respect to the point of imparting force between said tray and its support to cause the force, upon engagement of the tray with said last named means, to twist said tray and move the walls thereof relative to said grid and ice blocks in the compartments formed thereby.

7. A refrigerating apparatus comprising in combination, a cooling element, a resilient tray member adapted to contain a substance to be frozen by the cooling effect produced by said cooling element, a support member associated with said cooling element for supporting said tray member, means movably attached to one of said members and adapted to engage the other of said members for imparting a force between said members, said means being operable to move at least a portion of one of said members relative to the other of said members for breaking an ice bond therebetween, fixed means disposed in the path of movement of said one member and adapted to be engaged thereby for stopping the movement thereof, and said fixed means being arranged with respect to the point of imparting force between said members to cause the force to twist said tray member and break the bond between its frozen contents and walls thereof.

8. A freezing device comprising in combination, a refrigerating support member, a tray member on said support member adapted to contain a substance to be frozen by the refrigerating effect produced by said support member, means movably attached to one of said members and adapted to engage the other of said members for imparting force therebetween, said means being operable to move at least a portion of the tray member relative to its support member and break the ice bond therebetween, fixed means disposed in the path of movement of said tray and adapted to be engaged thereby for stopping the movement thereof, and said fixed means being arranged with respect to the point of imparting force to cause the force to twist said tray member and break the bond between its frozen contents and walls thereof.

9. A freezing device comprising in combination, a refrigerating support member, a tray member on said support member adapted to contain a substance to be frozen by the refrigerating effect produced by said support member, movable means for imparting force between said members, said means being operable to move at least a portion of the tray member relative to its support member and break the ice bond therebetween, fixed means disposed in the path of movement of said tray and adapted to be engaged thereby for stopping the movement thereof, and said fixed means being arranged with respect to the point of imparting force by said movable means to cause the force to twist said tray member about a horizontal axis extending longitudinally thereof for breaking the bond between the frozen contents and walls of the tray member.

10. The combination, with a support member, of a tray member removably carried by said support member and adapted to contain a substance to be frozen, means movably attached to one of said members and adapted to engage the other of said members for imparting force therebetween, said means being operable to move at least a portion of the tray member relative to its support member, fixed means in the path of movement of said tray member disposed to be engaged only at diagonally opposed points along the sides thereof for stopping movement of the tray member, and said first named means being normally so positioned with respect to said fixed means that the engagement of said tray member with said fixed means causes the force to twist said tray member about a horizontal axis extending longitudinally thereof for breaking the bond between the frozen contents and walls of the tray member.

DONALD H. REEVES.